United States Patent
Chen

(10) Patent No.: US 11,063,521 B2
(45) Date of Patent: Jul. 13, 2021

(54) SWITCHING POWER SUPPLY

(71) Applicant: FUJI ELECTRIC CO., LTD., Kawasaki (JP)

(72) Inventor: Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 17 days.

(21) Appl. No.: 16/777,824

(22) Filed: Jan. 30, 2020

(65) Prior Publication Data

US 2020/0169175 A1     May 28, 2020

Related U.S. Application Data

(63) Continuation of application No. PCT/JP2018/048081, filed on Dec. 27, 2018.

(30) Foreign Application Priority Data

Feb. 15, 2018 (JP) .............................. JP2018-024630

(51) Int. Cl.
 *H02M 3/335* (2006.01)
 *H02M 1/00* (2006.01)

(52) U.S. Cl.
 CPC .................. *H02M 3/33569* (2013.01); *H02M 2001/0058* (2013.01)

(58) Field of Classification Search
 CPC .......... H02M 2001/0058; H02M 3/335–33592
 See application file for complete search history.

(56) References Cited

U.S. PATENT DOCUMENTS

| | | | | |
|---|---|---|---|---|
| 10,148,188 B2* | 12/2018 | Koo | .................. | H02M 3/33523 |
| 2005/0099827 A1 | 5/2005 | Sase et al. | | |
| 2006/0187688 A1* | 8/2006 | Tsuruya | .................. | H01F 38/08 |
| | | | | 363/56.12 |
| 2010/0118565 A1* | 5/2010 | Stuler | ............... | H02M 3/33592 |
| | | | | 363/21.08 |
| 2012/0299561 A1* | 11/2012 | Chen | ................. | H02M 3/33507 |
| | | | | 323/235 |

(Continued)

FOREIGN PATENT DOCUMENTS

| JP | 2005151608 A | 6/2005 |
|---|---|---|
| JP | 2015061474 A | 3/2015 |
| JP | 2017229209 A | 12/2017 |

OTHER PUBLICATIONS

International Search Report for PCT/JP2018/048081, dated Mar. 5, 2019.
Written Opinion for PCT/JP2018/048081, dated Mar. 5, 2019.

*Primary Examiner* — Fred E Finch, III
(74) *Attorney, Agent, or Firm* — Rabin & Berdo, P.C.

(57) ABSTRACT

A switching power supply includes a current resonance-type DC-DC converter that has an auxiliary winding provided on the primary side of a transformer, divides a voltage, which has been generated in the auxiliary winding by a current resonance operation, using a voltage divider circuit formed of resistors, and supplies, to a control IC, the divided voltage as a detection voltage for the resonant voltage for setting a timing for turning off a switching element. A phase correcting capacitor is provided between the auxiliary winding and the voltage divider circuit and corrects a delay in switching timing by setting the phase of the voltage of the voltage divider circuit ahead of the voltage of the auxiliary winding.

5 Claims, 7 Drawing Sheets

(56) References Cited

U.S. PATENT DOCUMENTS

| | | | |
|---|---|---|---|
| 2013/0308347 A1* | 11/2013 | Sato ........................ | H02M 1/32 |
| | | | 363/21.03 |
| 2016/0329814 A1* | 11/2016 | Fahlenkamp ..... | H02M 3/33569 |
| 2017/0288553 A1* | 10/2017 | Fahlenkamp ..... | H02M 3/33592 |
| 2017/0366102 A1* | 12/2017 | Kikuchi ............ | H02M 3/33507 |
| 2017/0373604 A1 | 12/2017 | Chen | |
| 2019/0140550 A1* | 5/2019 | Song ................. | H02M 3/33507 |
| 2020/0014303 A1* | 1/2020 | Song ................. | H02M 3/33569 |
| 2020/0083811 A1* | 3/2020 | Koo ................... | H02M 3/33576 |
| 2020/0169180 A1* | 5/2020 | Jitaru ................ | H02M 3/33507 |
| 2020/0395863 A1* | 12/2020 | Song .................... | G01R 19/175 |
| 2020/0403521 A1* | 12/2020 | Zheng ............... | H02M 3/33507 |
| 2021/0006147 A1* | 1/2021 | Feldtkeller ........ | H02M 3/33523 |

\* cited by examiner

SWITCHING POWER SUPPLY

CROSS-REFERENCE TO RELATED APPLICATION

This application is a continuation application of International Application PCT/JP2018/048081 filed on Dec. 27, 2018 which designated the U.S., which claims priority to Japanese Patent Application No. 2018-024630, filed on Feb. 15, 2018, the entire contents of which are incorporated herein by reference.

BACKGROUND OF THE INVENTION

1. Field of the Invention

The embodiments discussed herein are related to a switching power supply equipped with a current resonance-type direct current (DC)-DC converter.

2. Background of the Related Art

Switching power supplies that use current resonance-type DC-DC converters achieve high efficiency and reduction in thickness, which has resulted in widespread use in liquid crystal display (LCD) televisions, alternating current (AC)-DC adapters, and the like. A switching power supply with a current resonance-type DC-DC converter is normally equipped with a half-bridge circuit in which two switching elements are connected in series, a resonance circuit, a DC voltage output circuit, and a control integrated circuit (hereinafter "control IC"). The resonance circuit is constructed of a series circuit with a resonant capacitor, a resonant inductor, and the primary coil of a transformer. In many cases, the leakage inductance of the transformer is used as the resonant inductor. However, it is also possible to connect a separate inductor to the transformer.

The switching elements that construct the half-bridge circuit are alternately switched on and off using signals outputted from a high-side driving circuit and a low-side driving circuit of the control IC. By performing on/off control of the switching elements, the resonance current of the resonance circuit is controlled. This resonance current is supplied to the secondary side of the transformer and is converted to a DC output voltage by the DC voltage output circuit. The output voltage is compared with a target voltage by a shunt regulator and a feedback signal indicating the difference with the target voltage is fed back to the control IC via a photocoupler. The control IC varies the switching frequency of the switching elements based on the feedback signal which is fed back and thereby performs control so that the output voltage becomes the target voltage.

Although the control IC in this configuration outputs a turn on instruction and a turn off instruction to the switching elements of the half-bridge circuit, there are delays from when the control IC outputs the turn on instruction and the turn off instruction to when the switching elements actually turn on and turn off.

For this reason, a resonant converter that advances the phase in the operating frequency that drives a switching element by a desired time from the timing at which the resonant current becomes zero has been disclosed (see for example, Japanese Laid-open Patent Publication No. 2005-151608 (Paragraph [0018] and FIG. 2)).

In this resonant converter, the resonant current waveform is detected using a current transformer and a phase locked loop (PLL) circuit is used to turn on a switching element immediately before the timing at which the detected resonant current becomes zero. Although the cited publication describes a correcting operation that considers delays at a switching element for only the timing at which a switching element is turned on, the operation may also be applied in the same way to the timing at which a switching element is turned off.

However, using a current transformer to detect a resonance current causes an increase in the cost of a switching power supply. In addition, although the PLL circuit for adjusting phase is implemented in the control IC, the large circuit scale may cause an increase in the cost of the control IC.

In addition, the delay time from the outputting of a turn off instruction until the switching element actually turns off greatly changes according to the type of switching power supply and is not constant. As one example, a switching power supply will use switching elements with different current capacities depending on the output capacity of the switching power supply, and due to the differences between switching elements, the delay time also differs. When the capacitance of the resonant capacitor in the resonance circuit differs, the delay will also differ. This means that it is not preferable to incorporate a function that uniformly sends out turn off instructions for the switching elements into a general-purpose control IC.

SUMMARY

According to an aspect, there is provided a switching power supply including: a transformer having a primary winding and an auxiliary winding a half-bridge circuit having a first switching element on a high side and a second switching element on a low side that are connected in series, a current resonance circuit including a resonant capacitor, a resonant inductor, and the primary winding of the transformer, a direct current (DC) voltage output circuit that rectifies and smooths power transmitted from the resonance circuit via the transformer to a DC voltage and outputs the DC voltage as an output voltage, a control circuit configured to control on and off of the first switching element and the second switching element, a feedback circuit that feeds back a feedback signal indicating a difference between the output voltage and a target voltage to the control circuit, a voltage divider circuit that divides a voltage induced in the auxiliary winding and supplies a divided voltage to the control circuit as a detection signal for a resonant voltage, and a phase correcting capacitor that is connected between the auxiliary winding and the voltage divider circuit, and advances a phase of the voltage divided by the voltage divider circuit beyond a phase of the voltage induced in the auxiliary winding.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

An embodiment will be described below with reference to the accompanying drawings. Note that in the following description, the same character strings may be used both for the names of terminals of component elements and voltages, signals, and the like at these terminals.

Figure 1:
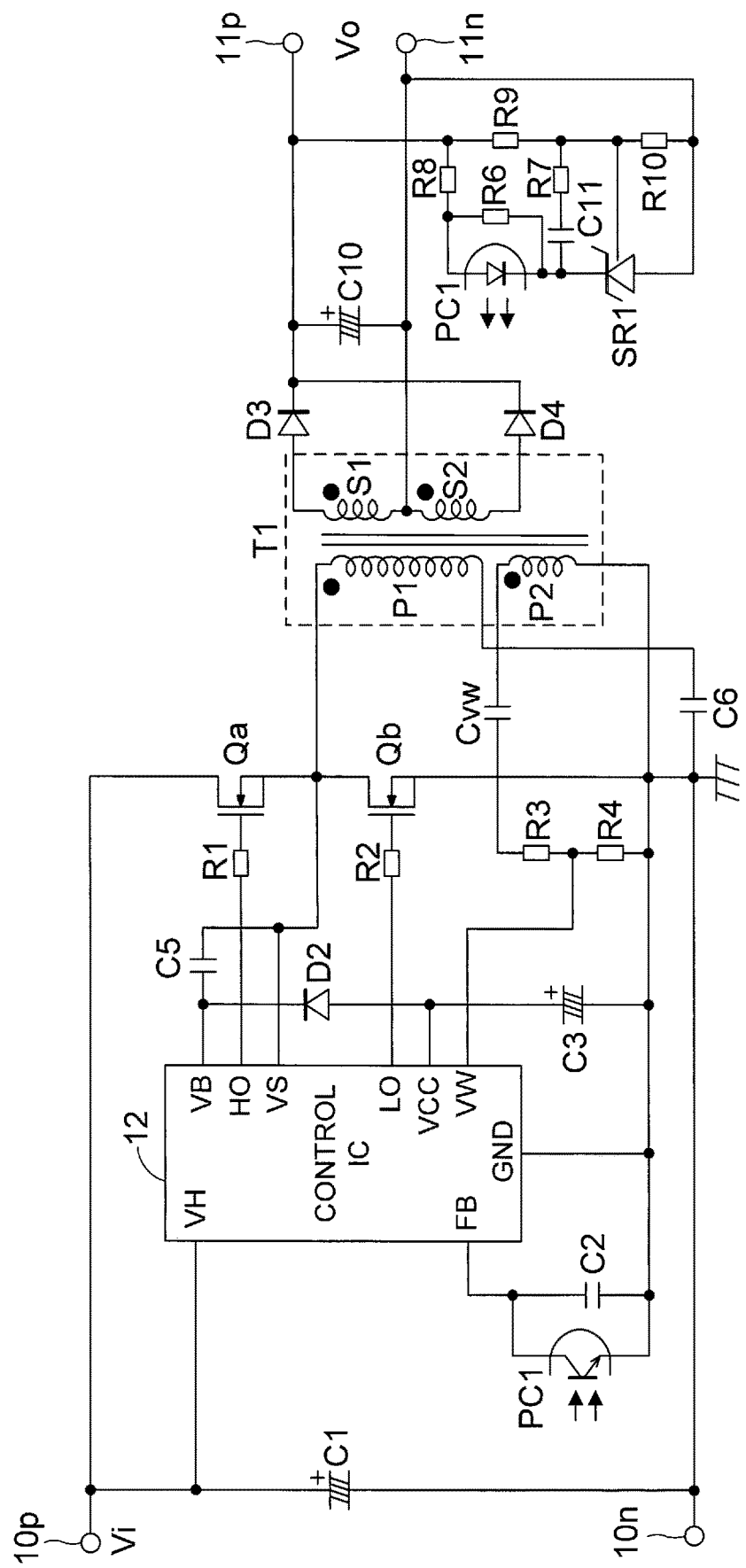
FIG. 1 is a circuit diagram depicting an example configuration of a switching power supply equipped with a current resonance-type DC-DC converter according to an embodiment.
Figure 2:
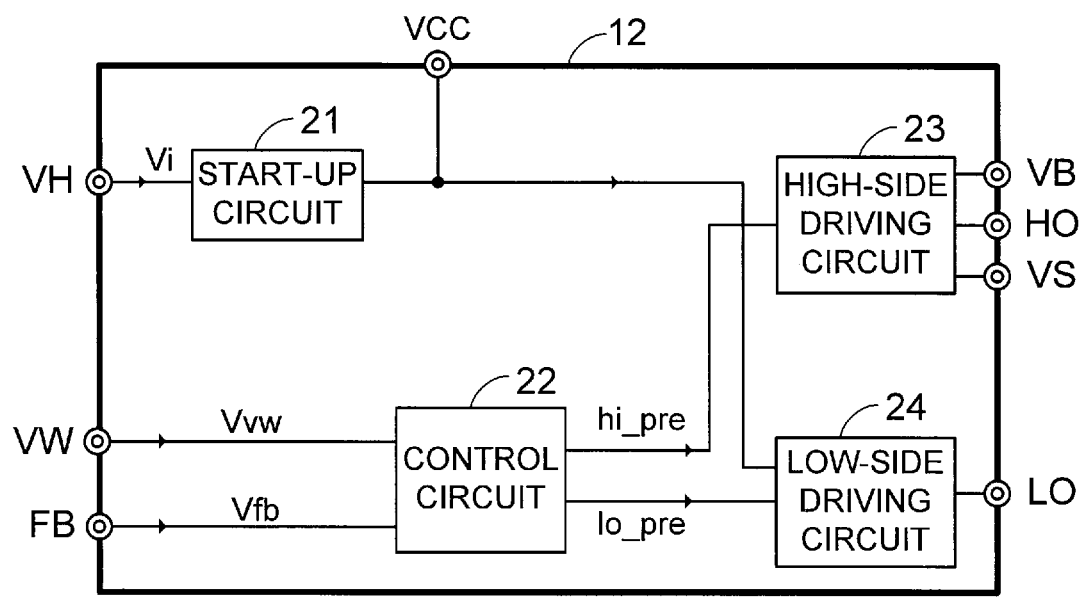
FIG. 2 depicts an example configuration of a control IC.
Figure 3:
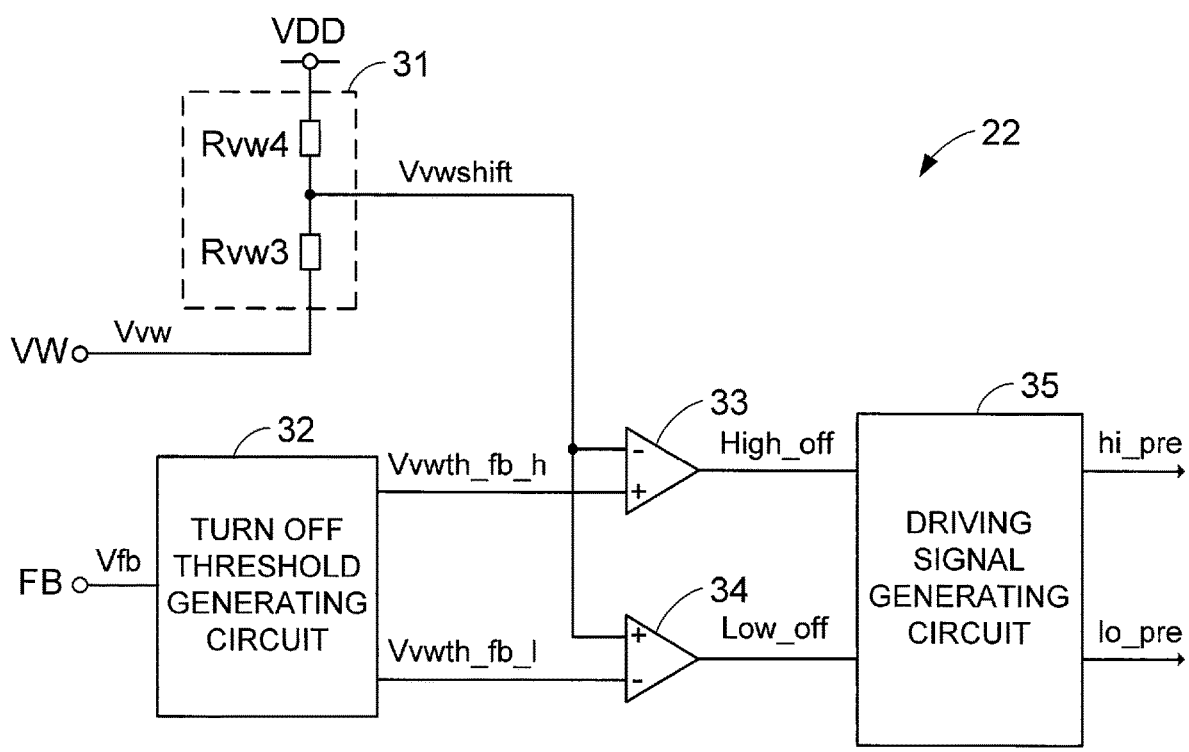
FIG. 3 depicts an example configuration of a control circuit.
Figure 4:
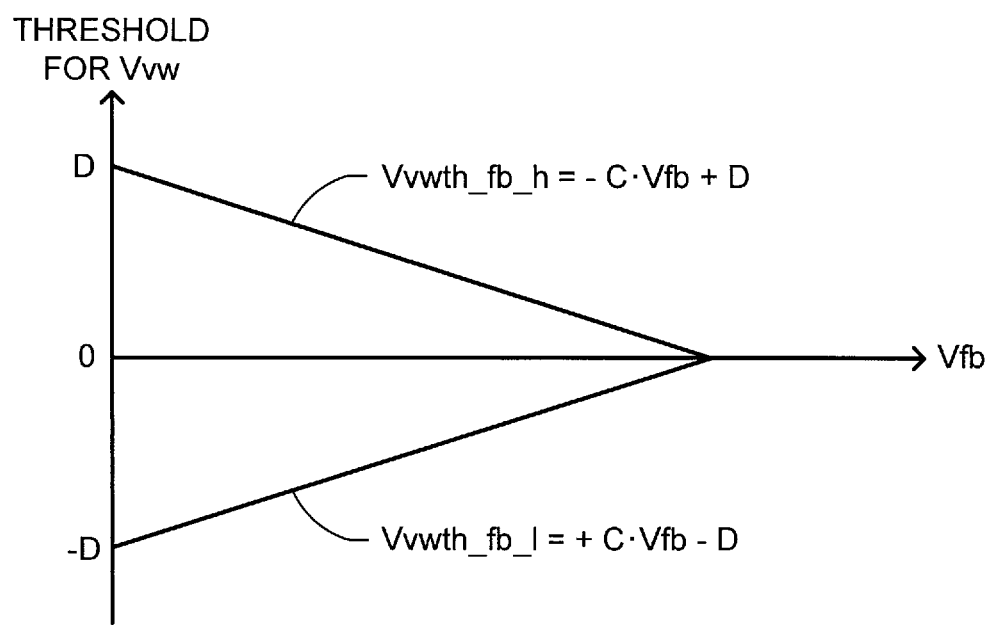
FIG. 4 is a diagram useful in explaining input/output characteristics of a turn off threshold generating circuit.
Figure 5:
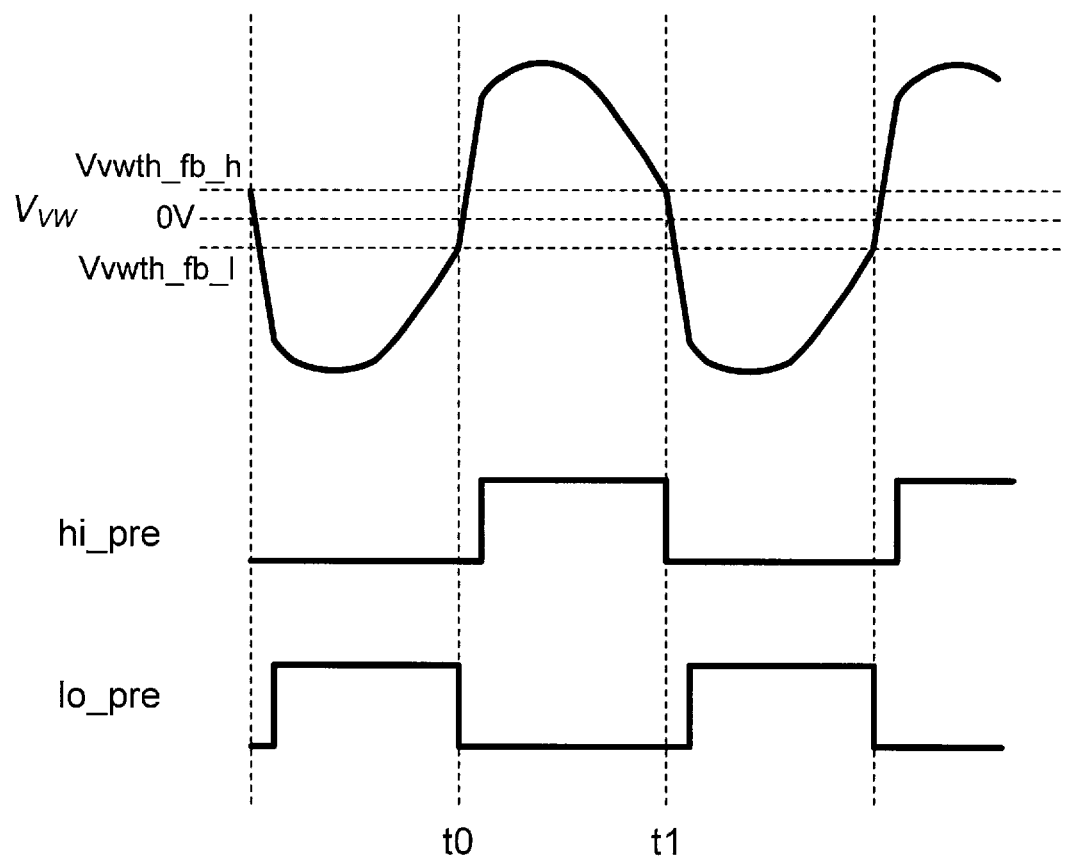
FIG. 5 is a timing chart for generation of turn off signals.

FIG. 1 is a circuit diagram depicting an example configuration of a switching power supply equipped with a current resonance-type DC-DC converter according to an embodiment. FIG. 2 depicts an example configuration of a control IC. FIG. 3 depicts an example configuration of a control circuit. FIG. 4 is a diagram useful in explaining input/output characteristics of a turn off threshold generating circuit. FIG. 5 is a timing chart for generation of turn off signals.

The switching power supply depicted in FIG. 1 has an input capacitor C1 connected across input terminals 10p and 10n. As one example, the switching power supply receives a DC input voltage Vi, which is a high voltage, is constant, and is generated by a power factor correction circuit. A half bridge circuit, which is formed of a series circuit with a high-side switching element Qa and a low-side switching element Qb, is also connected to the input terminals 10p and 10n. In the illustrated example, N-channel MOSFETs (Metal-Oxide-Semiconductor Field-Effect Transistors) are used as the switching elements Qa and Qb.

A connection point between the switching elements Qa and Qb is connected to one terminal of a primary winding P1 of a transformer T1, and the other terminal of the primary winding P1 is connected via a resonant capacitor C6 to ground. Here, the resonant capacitor C6 and a leakage inductance between the primary winding P1 and secondary windings S1 and S2 of the transformer T1 construct a resonance circuit. Note that instead of the leakage inductance, it is also possible to separately connect an inductor, which is separate to the inductor that constructs the transformer T1, in series to the resonant capacitor C6 and to use this inductor as the resonant reactance of a resonance circuit.

One terminal of the secondary winding S1 of the transformer T1 is connected to the anode terminal of a diode D3 and one terminal of the secondary winding S2 is connected to the anode terminal of a diode D4. The cathode terminals of the diodes D3 and D4 are both connected to a positive electrode terminal of an output capacitor C10 and to an output terminal 11p. A negative terminal of the output capacitor C10 is connected to a connection point between the secondary windings S1 and S2 and an output terminal 11n. The secondary windings S1 and S2, the diodes D3 and D4, and the output capacitor C10 construct a circuit that rectifies and smooths an AC voltage induced in the secondary winding S1 and S2 to convert the voltage to a DC output voltage Vo. This circuit constructs the output circuit of the switching power supply.

The positive electrode terminal of the output capacitor C10 is connected via a resistor R8 to the anode terminal of a light-emitting diode of a photocoupler PC1 and the cathode terminal of the light-emitting diode is connected to a cathode terminal of a shunt regulator SR1. A resistor R6 is connected across the anode terminal and the cathode terminal of the light-emitting diode. The anode terminal of the shunt regulator SR1 is connected to the output terminal 11n. The shunt regulator SR1 includes a reference terminal connected to a connection point between resistors R9 and R10, which are connected in series between the positive electrode terminal and the negative electrode terminal of the output capacitor C10. A series circuit formed of a resistor R7 and a capacitor C11 is connected between the reference terminal and the cathode terminal of the shunt regulator SR1.

The shunt regulator SR1 sends a current in keeping with a difference between a potential produced by dividing the output voltage Vo (that is, the voltage across both ends of the output capacitor C10) and an internal reference voltage to the light-emitting diode of the photocoupler PC1. By doing so, a current equivalent to the error between the output voltage Vo and a target voltage is sent to the light-emitting diode. The collector terminal of the phototransistor of the photocoupler PC1 is connected to an FB terminal of the control IC 12 and the emitter terminal is connected to ground. A capacitor C2 is connected between the collector terminal and the emitter terminal of the photocoupler PC1.

The control IC 12 is a control circuit that controls the switching power supply and includes a VH terminal connected to a positive electrode terminal of the input capacitor C1 and a GND terminal connected to ground. The control IC 12 also has an HO terminal connected via a resistor R1 to the gate terminal of the switching element Qa and an LO terminal connected via a resistor R2 to the gate terminal of the switching element Qb. In addition, the control IC 12 includes a VB terminal that is a high-side power supply terminal, a VS terminal that is a high-side reference potential terminal, a VCC terminal that is a low-side power supply terminal, and a VW terminal for detecting a resonant voltage. A capacitor C5 is connected between the VB terminal and the VS terminal, and the VS terminal is connected to a connection point between the switching elements Qa and Qb. The VCC terminal is connected to a positive electrode terminal of the capacitor C3 and a negative electrode terminal of the capacitor C3 is connected to ground. The VCC terminal is connected to the anode terminal of the diode D2 and the cathode terminal of the diode D2 is connected to the VB terminal.

The transformer T1 includes an auxiliary winding P2 on the primary side. One terminal of the auxiliary winding P2 is connected to one terminal of a phase correcting capacitor Cvw and the other terminal of the auxiliary winding P2 is connected to ground. The other terminal of the phase correcting capacitor Cvw is connected to one terminal of a resistor R3, the other terminal of the resistor R3 is connected to one terminal of a resistor R4, and the other terminal of the resistor R4 is connected to ground. A connection point between the resistors R3 and R4 is connected to the VW terminal of the control IC 12.

In this way, the switching power supply includes the phase correcting capacitor Cvw between the auxiliary winding P2 and a voltage divider circuit formed of the resistors R3 and R4, and is capable of advancing the phase of the voltage outputted from the voltage divider circuit beyond the phase of the voltage generated in the auxiliary winding P2.

As depicted in FIG. 2, the control IC 12 includes a start-up circuit 21, a control circuit 22, a high-side driving circuit 23, and a low-side driving circuit 24. The start-up circuit 21 has an input terminal that is connected to the VH terminal and inputs the input voltage Vi and has an output terminal that is connected to the VCC terminal and to the low-side driving circuit 24. A voltage VCC is supplied to the low-side driving circuit 24. The control circuit 22 is connected to the VW terminal to receive a voltage Vvw, and is also connected to the FB terminal to receive a voltage Vfb. The control circuit 22 is also connected to the high-side driving circuit 23 and outputs a high-side driving signal hi_pre and connected to the low-side driving circuit 24 and outputs a low-side driving signal lo_pre. The high-side driving circuit 23 drives the high-side switching element Qa in accordance with the high-side driving signal hi_pre and the low-side driving circuit 24 drives the low-side switching element Qb in accordance with the low-side driving signal lo_pre.

As depicted in FIG. 3, the control circuit 22 includes a level shifting circuit 31, a turn off threshold generating circuit 32, comparators 33 and 34, and a driving signal generating circuit 35. The level shifting circuit 31 includes a resistor Rvw3 that has one terminal connected to the VW terminal and a resistor Rvw4 that has one terminal connected to an internal power supply VDD. The other terminals of the resistor Rvw3 and the resistor Rvw4 are connected together and construct the output terminal of the level shifting circuit 31. The output terminal of the level shifting circuit 31 is connected to both the inverting input terminal of the comparator 33 and the non-inverting input terminal of the comparator 34 and supplies a signal Vvwshift produce by shifting the level of the voltage Vvw.

The turn off threshold generating circuit 32 has an input terminal connected to the FB terminal and receives an input of a voltage Vfb of the FB terminal. The turn off threshold generating circuit 32 includes an output terminal that outputs a high-side turn off threshold signal Vvwth_fb_h. This output terminal is connected to the non-inverting input terminal of the comparator 33. The turn off threshold generating circuit also includes an output terminal that outputs a low-side turn off threshold signal Vvwth_fb_1. This output terminal is connected to the inverting input terminal of the comparator 34. The turn off threshold generating circuit 32 inputs the voltage Vfb of the FB terminal and generates the high-side turn off threshold signal Vvwth_fb_h and the low-side turn off threshold signal Vvwth_fb_1.

The output terminal of the comparator 33 is connected to the driving signal generating circuit 35 and supplies a high-side turn off signal High_off. The output terminal of the comparator 34 is connected to the driving signal generating circuit 35 and supplies a low-side turn off signal Low_off.

The driving signal generating circuit 35 generates the high-side driving signal hi_pre and the low-side driving signal lo_pre based on the high side turn off signal High_off and the low_side turn off signal Low_off. The high-side driving signal hi_pre is supplied to the high-side driving circuit 23 and the low-side driving signal lo_pre is supplied to the low-side driving circuit 24.

In the control circuit 22, the turn off threshold signals Vvwth_fb_h and Vvwth_fb_1 generated by the turn off threshold generating circuit 32 are compared with the signal Vvwshift produced by shifting the level of the voltage Vvw of the VW terminal. In the control circuit 22 that is a single power supply that does not have a negative power supply, the turn off threshold generating circuit 32 is not capable of generating a low-side turn off threshold signal Vvwth_fb_1 that is negative, and for this reason, a level shift is performed on the voltage Vvw for comparison purposes which varies about a center level of zero volts. By doing so, the signal Vvwshift whose level has been shifted is capable of being compared with the turn off threshold signals Vvwth_fb_h and Vvwth_fb_1 in a range of voltages that is positive.

Next, the operation of the control circuit 22 will be described with reference to FIGS. 4 and 5. Note that in FIGS. 4 and 5, for ease of explanation, the voltage Vvw of the VW terminal and the turn off threshold voltage signals Vvwth_fb_h and Vvwth_fb_1 are depicted as varying about a center value of zero volts.

First, the turn off threshold generating circuit 32 has the input/output characteristics depicted in FIG. 4. That is, the high-side turn off threshold signal Vvwth_fb_h has a characteristic given as Expression (1) below whereby the signal changes on a gradient "−C" from an initial value "D" in accordance with the voltage Vfb during a period where the load falls to a predetermined load.

$$Vvwth\_fb\_h = -C \cdot Vfb + D \quad (1)$$

Likewise, the low-side turn off threshold signal Vvwth_fb_1 has a characteristic given as Expression (2) below whereby the signal changes on a gradient "C" from an initial value "−D" in accordance with the voltage Vfb during a period where the load falls to a predetermined load.

$$Vvwth\_fb\_1 = +C \cdot Vfb - D \quad (2)$$

C and D used here are positive constants. Note that the threshold depicted in FIG. 4 is expressed relative to the voltage Vvw before the level is shifted up by the level shifting circuit 31.

Next, the timing of generation of the high-side driving signal hi_pre and the low-side driving signal lo_pre from the voltage Vvw and the turn off threshold signals Vvwth_fb_h and Vvwth_fb_1 will be described with reference to FIG. 5. From the top, FIG. 5 depicts a waveform of the voltage Vvw of the VW terminal, the high-side driving signal hi_pre, and the low-side driving signal lo_pre. Note that for the configuration depicted in FIG. 1, the voltage Vvw is not proportional to the voltage of the resonant capacitor C6 and is proportional to the voltage of the primary winding P1 and decided by the on/off operation of the switching elements Qa and Qb and the voltage of the resonant capacitor C6.

Here, the voltage Vvw of the VW terminal varies, and when for example the voltage Vvw has risen to the low-side turn off threshold signal Vvwth_fb_1 at time t0, the turn off signal Low_off outputted by the comparator 34 becomes the high level from the low level. When the turn off signal Low_off at the high level is inputted, the driving signal generating circuit 35 sets the low-side driving signal lo_pre at the low level and outputs the low-side driving signal lo_pre. After this, at time t1, when the voltage Vvw has fallen to the high-side turn off threshold signal Vvwth_fb_h, the turn off signal High_off outputted by the comparator 33 becomes the high level from the low level. When the turn off signal High_off at the high level is inputted, the driving signal generating circuit 35 sets the high-side driving signal hi_pre at the low level and outputs the high-side driving signal hi_pre.

Note that the high-side driving signal hi_pre rises to the high level after a predetermined dead time has passed from the low-side driving signal lo_pre falling to the low level. In the same way, the low_side driving signal lo_pre rises to the high level after a predetermined dead time has passed from the high-side driving signal hi_pre falling to the low level.

Here, when the voltage Vvw has been shifted up at the level shifting circuit 31, let us consider how the turn off threshold signals Vvwth_fb_h and Vvwth_fb_1 depicted in FIG. 4 change with vertical symmetry. First, the signal Vvwshift produced by shifting up the voltage Vvw is expressed as Expression (3) below.

$$Vvwshift = E \cdot VDD + F \cdot Vvw \quad (3)$$

Here, when the resistance values of the resistors Rvw3 and Rvw4 of the level shifting circuit 31 are respectively expressed as Rvw3 and Rvw4, E and F are given by Expressions (4) and (5) below.

$$E = Rvw3/(Rvw3 + Rvw4) \quad (4)$$

$$F = Rvw4/(Rvw3 + Rvw4) \quad (5)$$

Accordingly, the signal Vvwshift with respect to Expression (1) is given by Expression (6) below.

$$Vvwshift = E \cdot VDD + F(-C \cdot Vfb + D) \quad (6)$$
$$= -C \cdot F \cdot Vfb + (E \cdot VDD + D \cdot F)$$

On the other hand, the signal Vvwshift with respect to Expression (2) is given by Expression (7) below.

$$Vvwshift = E \cdot VDD + F(C \cdot Vfb - D) \quad (7)$$
$$= C \cdot F \cdot Vfb + (E \cdot VDD - D \cdot F)$$

Note that in the present embodiment, the resistors Rvw3 and Rvw4 have the same resistance value so that Rvw3=Rvw4 and Expression (4) and (5) are simplified to Expression (8) below.

$$E = F = \frac{1}{2} \quad (8)$$

Substituting Expression (8) into Expression (6) gives Expression (9) below.

$$Vvwshift = -C \cdot Vfb/2 + (VDD + D)/2 \quad (9)$$

Substituting Expression (8) into Expression (7) gives Expression (10) below.

$$Vvwshift = C \cdot Vfb/2 + (VDD - D)/2 \quad (10)$$

The description will now focus on what level of delay may be corrected by a phase correcting capacitor Cvw when the phase correcting capacitor Cvw is installed between the auxiliary winding P2 of the transformer T1 and the voltage divider circuit formed of the resistors R3 and R4.

Figure 6:
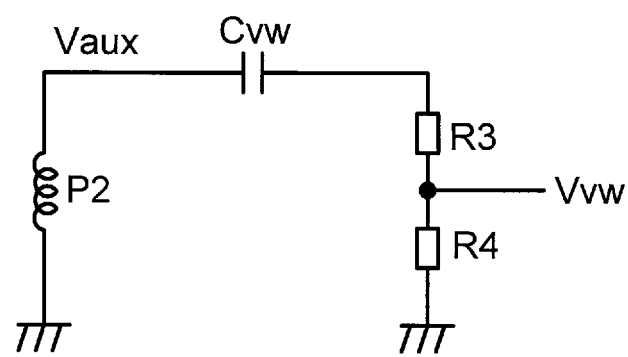
FIG. 6 is a diagram useful in explaining a frequency response between the voltage of an auxiliary winding and a voltage outputted from a resistance-based voltage divider circuit.

FIG. 6 is a diagram useful in explaining the frequency response between the voltage of the auxiliary winding and the voltage outputted from a resistance-based voltage divider circuit.

The frequency response P (jω) of a circuit including the phase correcting capacitor Cvw and the resistors R3 and R4 is expressed by the ratio between the output voltage and the input voltage as in Expression (11) below.

$$P(j\omega) = Vvw/Vaux \quad (11)$$

Here, Vaux is a voltage generated in the auxiliary winding P2, and Vvw is a voltage supplied to the VW terminal of the control IC 12.

Since the voltage Vvw is a voltage value produced by dividing the voltage Vaux with the phase correcting capacitor Cvw and the resistors R3 and R4, when the impedance of the phase correction capacitor Cvw is expressed as "Zcvw", Vvw is given by Expression (12) below.

$$Vvw = Vaux \cdot (R4/(Zcvw + R3 + R4)) \quad (12)$$

This in turn gives Expression (13) below.

$$Vvw/Vaux = R4/(Zcvw + R3 + R4) \quad (13)$$

Here, since the impedance Zcvw of the phase correcting capacitor Cvw is $1/j\omega Cvw$, the frequency response P(jω) is given by Expression (14).

$$P(j\omega) = \frac{R4}{\frac{1}{j\omega Cvw} + R3 + R4} = \frac{j\omega CvwR4}{j\omega Cvw(R3 + R4) + 1} \quad (14)$$

Next, the phase θ of the frequency response P(jω) is calculated. To do so, the denominator and numerator of Expression (14) are multiplied by $-j\omega Cvw(R3+R4)+1$. This gives by Expression (15).

$$P(j\omega) = \frac{j\omega Cvw(-j\omega Cvw(R3 + R4) + 1)}{\omega^2 Cvw^2(R3 + R4)^2 + 1} \quad (15)$$
$$= \frac{\omega^2 Cvw^2 R4(R3 + R4) + j\omega CvwR4}{\omega^2 Cvw^2(R3 + R4)^2 + 1}$$

In Expression (15), the first item on the right side is a real part Re and the second item is an imaginary part Im.

From Expression (15), the phase θ of the frequency response P(jω) is given by Expression (16).

$$\theta = \angle P(j\omega) = \tan^{-1}\frac{\text{Im}}{\text{Re}} = \tan^{-1}\frac{1}{\omega Cvw(R3 + R4)} \quad (16)$$

The gain |P(jω)| of the frequency response P(jω) is given by Expression (17).

$$|P(j\omega)| = \sqrt{\text{Re}^2 + \text{Im}^2} = \frac{\omega CvwR4}{\sqrt{\omega^2 Cvw^2(R3 + R4)^2 + 1}} \quad (17)$$

Here, actual numerical values were substituted into Expression (16) and Expression (17). As one example, when the switching frequency is 100 kHz, the phase correcting capacitor Cvw is 1 nF, the resistor R3 is 20 kΩ, and the resistor R4 is 2 kΩ, the values $\Omega=2\pi \times 100 \times 10^3$, Cvw=1× $10^{-9}$, R3=20×10³ and R4=2×10³ are substituted. In this case, the phase θ of the frequency response P(jω) is given by Expression (18) below.

$$\theta = 4.138° \quad (18)$$

and the gain |P(jω)| is given by Expression (19) below.

$$|P(j\omega)| = 0.090669 \quad (19)$$

When the phase θ is viewed for a 100 kHz cycle (10 μs), Expression (20) below is obtained.

$$10 \text{ μs} \times (4.138/360) = 0.115 \text{ μs} \quad (20)$$

As a result, from Expression (18), it is understood that the phase of the voltage Vvw is advanced by 4.138° relative to the voltage Vaux of the auxiliary winding P2. It is also understood that it is possible to correct the turn off delay time in this example by 0.115 μs (115 ns).

Note that in a conventional configuration where the phase correcting capacitor Cvw is not present, the gain |P(jω)| is given by Expression (21) below.

$$|P'(j\omega)|=R4/(R3+R4)=0.090909 \quad (21)$$

It is therefore understood that the provision of the phase correcting capacitor Cvw results in hardly any drop in gain.

Since the switching frequency(=ω/2π) and the resistors R3 and R4 do not change in Expression (15), the correction to the turn off delay time is determined by the capacitance of the externally provided phase correcting capacitor Cvw. Accordingly, by adjusting the capacitance of the externally provided phase correcting capacitor Cvw, it is easy to adjust the timing at which turning off occurs.

The processing that generates the turn off threshold is performed by analog processing in the turn off threshold generating circuit 32 of the control circuit 22 in FIG. 3. A case where the turn off threshold generating circuit 32 performs this turn off threshold generating processing by digital processing will now be described.

Figure 7:
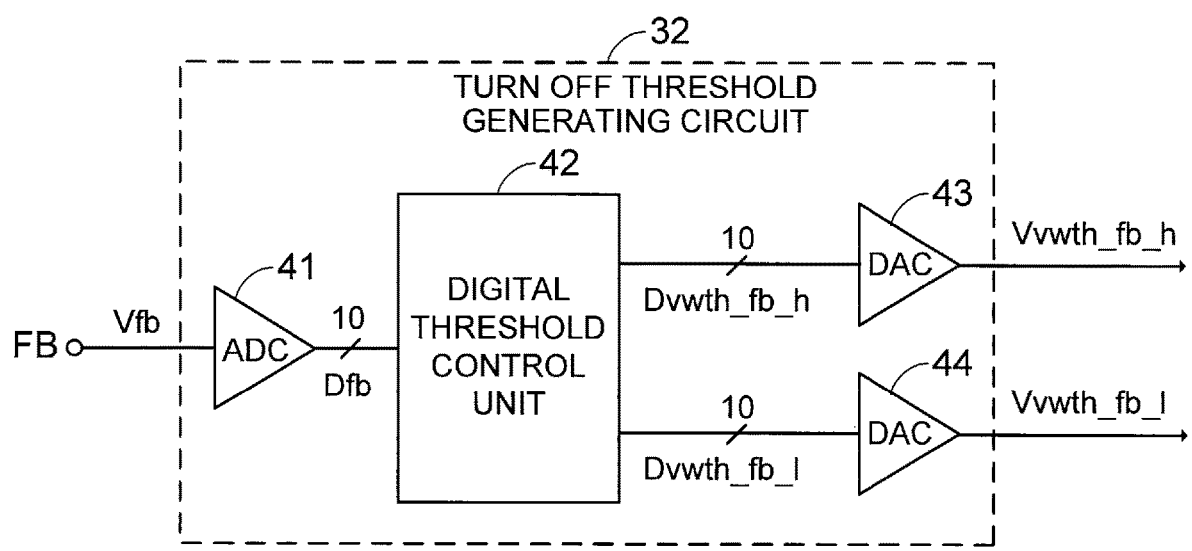
FIG. 7 depicts another example configuration of a turn off threshold generating circuit.

FIG. 7 depicts another example configuration of a turn off threshold generating circuit.

The turn off threshold generating circuit 32 includes an analog-to-digital converter 41, a digital threshold control circuit 42, and digital-to-analog converters 43 and 44. An input terminal of the analog-to-digital converter 41 is connected to the FB terminal, an output terminal is connected to the digital threshold control circuit 42, and an analog voltage Vfb is converted to a 10-bit digital signal Dfb. The digital threshold control circuit 42 has a first output terminal connected to an input terminal of the digital-to-analog converter 43 and a second output terminal connected to an input terminal of the digital-to-analog converter 44. The digital threshold control circuit 42 processes the inputted digital signal Dfb and outputs a 10-bit digital signal Dvwth_fb_h of a threshold that turns off the high-side switching element Qa to the first output terminal. The processing by the digital threshold control circuit 42 is carried out based on the input/output characteristics of the turn off threshold generating circuit 32 depicted in FIG. 4. The digital threshold control circuit 42 also processes the inputted digital signal Dfb and outputs a 10-bit digital signal Dvwth_fb_1 of a threshold that turns off the low-side switching element Qb to the second output terminal. The digital-to-analog converter 43 converts the digital signal Dvwth_fb_h to the analog turn off threshold signal Vvwth_fb_h, which is outputted. The digital-to-analog converter 44 converts the digital signal Dvwth_fb_1 to the analog turn off threshold signal Vvwth_fb_1, which is outputted.

In the switching power supply with the configuration described above, since the turn off delay time of the switching elements Qa and Qb differs according to the device type, the capacity of the external phase correcting capacitor Cvw is decided in accordance with this delay time. To do so, first, the turn off delay time is measured in a state where the phase correcting capacitor Cvw has not been incorporated. Next, the phase θ corresponding to the delay time is calculated from the measured turn off delay time, and the capacitance of the phase correcting capacitor Cvw is found from this phase θ using Expression (16). In this way, by correcting the turn off delay time using the external phase correcting capacitor Cvw, it is possible to optimally correct the delay in accordance with the type of switching power supply.

The switching power supply of the above configuration is capable of correcting the delay for a turn off instruction by merely externally adding a phase correcting capacitor. Since this phase correcting capacitor is external, there is the advantage that by adjusting the capacitance of the phase correcting capacitor, it is possible to easily cancel out a delay that will differ depending on the type of the switching power supply.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply, comprising:
   a transformer having a primary winding and an auxiliary winding
   a half-bridge circuit having a first switching element on a high side and a second switching element on a low side that are connected in series;
   a current resonance circuit including a resonant capacitor, a resonant inductor, and the primary winding of the transformer;
   a direct current (DC) voltage output circuit that rectifies and smooths power transmitted from the resonance circuit via the transformer to a DC voltage and outputs the DC voltage as an output voltage;
   a control circuit configured to control on and off of the first switching element and the second switching element;
   a feedback circuit that feeds back a feedback signal indicating a difference between the output voltage and a target voltage to the control circuit;
   a voltage divider circuit that divides a voltage induced in the auxiliary winding and supplies a divided voltage to the control circuit as a detection signal for a resonant voltage; and
   a phase correcting capacitor that is connected between the auxiliary winding and the voltage divider circuit, and advances a phase of the voltage divided by the voltage divider circuit beyond a phase of the voltage induced in the auxiliary winding.

2. The switching power supply according to claim 1, wherein the control circuit includes:
   a level shifting circuit that shifts a level of a voltage supplied from the voltage divider circuit to output a level shifted signal;
   a turn off threshold generating circuit that generates a first turn off threshold for the high side and a second turn off threshold for the low side from the feedback signal;
   a first comparator that compares the level shifted signal with the first turn off threshold and outputs a first turn off signal that turns off the first switching element;
   a second comparator that compares the level shifted signal with the second turn off threshold and outputs a second turn off signal that turns off the second switching element; and
   a driving signal generating circuit that generates a high side driving signal that turns off the first switching element at a timing where the first turn off signal is received, and a low side driving signal that turns off the second switching element at a timing where the second turn off signal is received.

3. The switching power supply according to claim 2, wherein the turn off threshold generating circuit includes:
- an analog-to-digital converter that converts the feedback signal from analog to digital;
- a digital threshold control circuit that generates a first digital turn off threshold for the high side and a second digital turn off threshold for the low side from the feedback signal that has been converted to digital by the analog-to-digital converter;
- a first digital-to-analog converter that converts the first digital turn off threshold to analog to output the first turn off threshold; and
- a second digital-to-analog converter that converts the second digital turn off threshold to analog to output the second turn off threshold.

4. The switching power supply according to claim 2, wherein the turn off threshold generating circuit generates the first turn off threshold and the second turn off threshold such that the first switching element is turned off in response to the voltage supplied from the voltage divider circuit falling below $(-C \times Vfb+D)$, where Vfb is a value of the feedback signal and C and D are positive constants, and that the second switching element is turned off in response to the voltage supplied from the voltage divider circuit rising above $(+C \times Vfb-D)$.

5. The switching power supply according to claim 1, wherein the resonant inductor is a leakage inductance of the transformer or an inductor that is different from an inductor that constructs the transformer.

\* \* \* \* \*